United States Patent
Park et al.

(10) Patent No.: US 7,695,869 B2
(45) Date of Patent: Apr. 13, 2010

(54) POSITIVE ACTIVE MATERIAL FOR LITHIUM SECONDARY BATTERY AND METHOD OF PREPARING SAME

(75) Inventors: Jung-Joon Park, Suwon-si (KR); Su-Ho Song, Suwon-si (KR); Wan-Seog Oh, Suwon-si (KR); Jae-Chul Um, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 12/354,528

(22) Filed: Jan. 15, 2009

(65) Prior Publication Data

US 2009/0127504 A1 May 21, 2009

Related U.S. Application Data

(62) Division of application No. 11/061,969, filed on Feb. 16, 2005.

(30) Foreign Application Priority Data

Feb. 17, 2004 (KR) ...................... 10-2004-0010262

(51) Int. Cl.
   *H01M 4/58* (2006.01)
(52) U.S. Cl. ............ 429/231.3; 429/231.1; 429/231.95; 423/594.6; 423/518; 423/464; 423/306
(58) Field of Classification Search ............... 429/231.3, 429/231.1, 231.95; 423/594.6, 518, 464, 423/306
   See application file for complete search history.

(56) References Cited

U.S. PATENT DOCUMENTS 5,246,796 A   9/1993   Nagamine et al.

FOREIGN PATENT DOCUMENTS

| CN | 1187265 A | 7/1998 |
| CN | 1711660 A | 12/2005 |
| JP | 5-258751 | 10/1993 |
| JP | 05-266889 | 10/1993 |
| JP | 6-243897 | 9/1994 |
| JP | 11-154509 | 6/1999 |
| JP | 2001-167761 | 6/2001 |
| JP | 2001-297761 | 10/2001 |
| JP | 2003-142093 | 5/2003 |
| JP | 2004-172114 | 6/2004 |
| JP | 2004-288398 | 10/2004 |
| WO | WO99/49528 | 9/1999 |

OTHER PUBLICATIONS

U.S. Office action dated Apr. 2, 2009, for parent U.S. Appl. No. 11/061,969, noting listed references in this IDS.

*Primary Examiner*—Laura S Weiner
(74) *Attorney, Agent, or Firm*—Christie, Parker & Hale, LLP

(57) ABSTRACT

Disclosed in a positive active material for a lithium secondary battery including a compound represented by formula 1 and having a 10% to 70% ratio of diffracted intensity of diffraction lines in 2θ=53° (104 plane) with respect to diffracted intensity of diffraction lines in the vicinity of 2θ=22° (003 plane) in X-ray diffraction patterns using a CoKα-ray, $$Li_xCoO_{2-y}A_y \qquad (1)$$

wherein, x is from 0.90 to 1.04, y is from 0 to 0.5, and A is selected from the group consisting of F, S and P.

5 Claims, 1 Drawing Sheet

POSITIVE ACTIVE MATERIAL FOR LITHIUM SECONDARY BATTERY AND METHOD OF PREPARING SAME

CROSS-REFERENCE TO RELATED APPLICATIONS

This application is a Divisional of U.S. patent application Ser. No. 11/061,969; filed Feb. 16, 2005 which claims priority to and the benefit of Korean Patent Application No. 10-2004-0010262 filed on Feb. 17, 2004 in the Korean Intellectual Property Office, the entire content of which is incorporated herein by reference.

FIELD OF THE INVENTION

The present invention relates to a positive active material for a lithium secondary battery and a method of preparing the same, and more particularly to a positive active material for a lithium secondary battery and a method of preparing the same having excellent cycle-life characteristics.

BACKGROUND OF THE INVENTION

Lithium secondary batteries include a positive electrode and a negative electrode including materials in which lithium intercalation reversibly occurs as positive and negative active materials, and an organic electrolyte or a polymer electrolyte presented between the positive electrode and the negative electrode. The batteries produce and store electric energy by a redox reaction when the lithium ions are intercalated into and deintercalated from the positive electrode and the negative electrode.

Conventionally, lithium metal was used as a negative active material for lithium secondary batteries. However, an explosion can be caused by a short circuit of the battery due to formation of dendrites when using lithium metal. Therefore, carbonaceous materials such as amorphous carbon, crystalline carbon, etc. have been used recently as the negative active material in place of lithium metal.

A chalcogenide compound may be used as a positive active material. For example, composite metal oxides such as $LiCoO_2$, $LiMn_2O_4$, $LiNiO_2$, $LiNi_{1-x}Co_xO_2$ (where $0 \leq x \leq 1$), $LiMnO_2$, etc. have been studied as the chalcogenide compound. Among the positive active materials, Co-based positive active materials such as $LiCoO_2$ are mainly used because the Co-based positive active materials have high electric conductivity, a high battery voltage, and excellent electrode characteristics.

SUMMARY OF THE INVENTION

In one embodiment of the present invention, a positive active material for a lithium secondary battery is provided having excellent cycle life characteristics.

In another embodiment of the present invention, a positive active material for a lithium secondary battery is provided having excellent capacity and potential characteristics.

In yet another embodiment of the present invention, a method is provided for preparing the positive active material for a lithium secondary battery.

In still another embodiment of the invention, a positive active material for a lithium secondary battery is provided including a compound represented by formula 1:

$$Li_xCoO_{2-y}A_y \qquad (1)$$

wherein x is from 0.90 to 1.04, y is from 0 to 0.5, and A is F, S or P. The positive active material has a ratio of diffracted intensity of diffraction lines in $2\theta=53°$ (104 plane) with respect to diffracted intensity of diffraction lines in the vicinity of $2\theta=22°$ (003 plane) in X-ray diffraction patterns using a CoKα-ray from 10% to 70%.

Further, the positive active material has a ratio of diffracted intensity of diffraction lines in $2\theta=45°$ (104 plane) with respect to diffracted intensity of diffraction lines in the vicinity of $2\theta=18°$ (003 plane) from 20% to less than 40%, and a full width at half-maximum of diffraction lines in $2\theta=18°$ (003 plane) is 0.08 to 0.16 in X-ray diffraction patterns using a CuKα-ray.

The present invention further provides a method of preparing the positive active material. In this method, a lithium source and a cobalt source are mixed at a mole ratio from 0.90 to 1.04 mole of lithium based on 1 mole of cobalt; and the mixture is sintered at 950 to 980° C.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION

Figure 1:
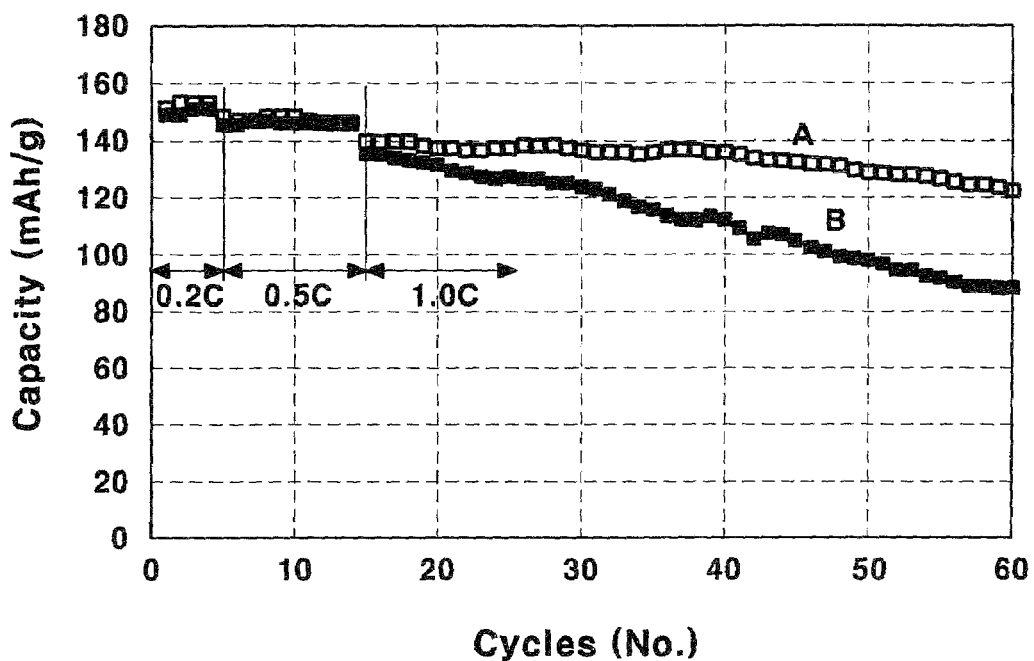
FIG. 1 is a graph showing cycle-life characteristics of positive active materials according to Example 2 of the present invention and Comparative Example 1.

In a lithium ion battery, battery performance is influenced by electrical characteristics such as ionic conductivity, electrical conductivity, etc. of a positive active material. Particularly, the battery performance is highly influenced by the crystal structure of the positive active material. Therefore, by controlling the crystal structure of the positive active material, improvements in battery performance can be realized.

In the present invention, the physical properties of the crystal structure of the positive active material are determined according to X-ray diffraction analysis.

The positive active material of the invention is a cobalt-based compound represented by formula 1:

$$Li_xCoO_{2-y}A_y \qquad (1)$$

wherein x is from 0.90 to 1.04, y is from 0 to 0.5, and A is F, S or P. The value of x may be decreased by charge and discharge of the battery. The positive active material has a 10% to 70% ratio (hereinafter, referred to as the "Co intensity ratio") of diffracted intensity of diffraction lines in $2\theta=53°$ (104 plane) with respect to diffracted intensity of diffraction lines in the vicinity of $2\theta=22°$ (003 plane) in X-ray diffraction patterns using a CoKα-ray. The ratio of diffracted intensity of diffraction lines in $2\theta=45°$ (104 plane) with respect to diffracted intensity of diffraction lines in the vicinity of $2\theta=18°$ (003 plane) is from 20% to less than 40% (hereinafter, referred to as the "Cu intensity ratio"), and a full width at half-maximum of diffraction lines in $2\theta=18°$ (003 plane) is 0.08 to 0.16 in X-ray diffraction patterns using a CuKα-ray, The diffracted intensities are measured under tube voltages/currents of 30 to 40 kV/10 to 30 mA, measured angles of 15 to 70°, step sizes of 0.02 to 0.06° per step, scanning time per step of 0.5 to 1.5 s by consecutive scan type, a divergence slit of 1 to 2°, and a light receiving slit of 0.1 to 0.5 mm. Particularly, when using a CuKα-ray, the diffracted intensities are measured under measured angles of 15 to 70°, a scanning speed of 2 to 4/minute, sample revolving speed of 40 to 60 revolutions/minute, a divergence slit of 1 to 2°, and a light receiving slit of 0.1 to 0.5 mm.

A positive active material having a Co intensity ratio of 10% to 70% exhibits excellent cycle-life characteristics. The cycle-life characteristics tend to degrade when the Co intensity ratio deviates from this range. In addition, a positive active material having a Cu intensity ratio from 20% to less than 40% exhibits excellent capacity and potential characteristics according to discharge speed. These properties tend to degrade when the Cu intensity ratio deviates from this range. Furthermore, the positive active material having a full width at a half-maximum of 0.08 to 0.16 has excellent cycle-life characteristics. Therefore, it is preferred that the half width does not deviate from this scope.

Japanese Patent Laid-open Publication No. 1993-258751 discloses the above diffraction intensity and discharge capacity. However, in the positive active material of the battery, the ratio of diffracted intensity of diffraction lines in 2θ=44° (104 plane) with respect to diffracted intensity of diffraction lines in the vicinity of 2θ=18° (003 plane) is 0.4 to 0.75 in X-ray diffraction patterns using a CuKα-ray. As a result, the ratio of diffracted intensity of the material disclosed in Japanese Patent Laid-open Publication No. 1993-258751 deviates from the ratio of diffracted intensity of the positive active material according to the invention. Therefore, it can be well understood in the art that the positive active material of Japanese Patent Laid-open Publication No. 1993-258751 cannot achieve the cycle-life characteristics of the present invention.

The positive active material of the present invention has an average particle diameter (D50) of 8 to 13 μm. When the average particle diameter (D50) of the positive active material exceeds 13 μm, life and potential characteristics are degraded.

In this way, the positive active material of the invention has optimized physical properties with excellent cycle-life characteristics and capacity and potential characteristics according to discharge speed.

The positive active material having the physical properties can be prepared by controlling a sintering process. The positive active material preparation will be illustrated below.

A lithium source and a cobalt source are mixed at a mole ratio of 0.90 to 1.04 mole of lithium based on 1 mol of cobalt.

When the amount of lithium based on 1 mole of cobalt 1 is 0.90 mol or less or more than 1.04 mol, the physical properties of the invention are not satisfied, thereby causing degradation of the battery properties.

The lithium source may include lithium hydroxide, lithium nitrate, lithium carbonate, or lithium acetate. The cobalt source may include cobalt oxide, cobalt nitrate, or cobalt carbonate.

Next, the compound is sintered at 950 to 980° C. When the sintering temperature deviates from the above range, the physical properties of the invention are not satisfied, thereby causing degradation of the battery properties. The sintering time can be changed with regard to the sintering temperature. However, for the range of the sintering temperature identified above, it is suitable to perform the sintering process for six to ten hours.

Hereinafter, the following examples and comparative examples illustrate the present invention in further detail. However, it is understood that the examples are for illustration only and that the present invention is not limited to these examples.

EXAMPLE 1

$Li_2CO_3$ and $CO_3O_4$ were mixed at a mole ratio of 1.03:1 and the resulting mixture was sintered at 950° C. for 6 hours, thereby obtaining a $Li_{1.03}CO_2$ positive active material with an average particle diameter of 9.6 μm.

EXAMPLE 2

A $Li_{1.03}CoO_2$ positive active material with an average particle diameter of 12.3 μm was prepared in the same way as with Example 1 except that the sintering temperature for the positive active material was 980° C.

Comparative Example 1

A $Li_{1.03}CoO_2$ positive active material with an average particle diameter of 8.6 μm was prepared in the same way as with Example 1 except that the sintering temperature for the positive active material was 870° C.

In X-ray diffraction patterns using a CoKα-ray of the positive active materials fabricated by the methods of Examples 1 and 2 and Comparative Example 1, ratios of diffracted intensity of diffraction lines in 2θ=53° (104 plane) with respect to diffracted intensity of diffraction lines in the vicinity of 2θ=22° (003 plane) were measured under the following measurement conditions, and the results are shown in Table 1.

Tube Voltage/Current: 40 kV/30 mA
Measured Angles: 15 to 70°
Step Size: 0.04°/step
Scan Type Consecutive
Scanning Time per Step: 1.00 s
Divergence Slit: 1°
Light Receiving Slit: 0.1 mm

TABLE 1

| | Ratio of diffracted intensity (104/003) |
|---|---|
| Example 1 | 31% |
| Example 2 | 56% |
| Comparative Example 1 | 8% |

As shown in Table 1, since the positive active materials of Examples 1 and 2 have Co intensity ratios within a range of 10 to 70%, it can be predicted that these positive active materials have excellent cycle-life characteristics.

In addition, batteries fabricated by using the positive active materials of Example 2 and Comparative Example 1 were charged and discharged four times at 0.2 C, 10 times at 0.5 C, and 46 times at 1.0 C to measure their cycle-life characteristics. The results are illustrated in FIG. 1. As shown in FIG. 1, the battery using the positive active material (A) of Example 2 is superior to that of Comparative Example 1 (B) in cycle-life characteristics. Therefore, it is understood that the prediction from the results shown in Table 1 is correct.

EXAMPLE 3

$Li_2CO_3$ and $CO_3O_4$ were mixed at a mole ratio of 1.02:1 and the mixture was sintered for seven hours at 970° C., thereby obtaining a $Li_{1.02}CoO_2$ positive active material with an average particle diameter of 9.6 μm,

EXAMPLE 4

A $Li_{1.03}CO_2$ positive active material with an average particle diameter of 11.4 μm was prepared in the same way as Example 3, except that the mixing mole ratio of $Li_2CO_3$ and $CO_3O_4$ was 1.03:1.

Comparative Example 2

A $Li_{0.99}CoO_2$ positive active material with an average particle diameter of 7.5 μm was prepared in the same way as Example 3, except that the mixing mole ratio of $Li_2CO_3$ and $Co_3O_4$ was 0.99:1.

Comparative Example 3

A $Li_{0.97}CoO_2$ positive active material with an average particle diameter of 7.5 μm was prepared in the same way as Example 3 except that the mixing molar ratio of $Li_2CO_3$ and $Co_3O_4$ for the positive active material was 0.97:1.

In the X-ray diffraction patterns using a CuKα-ray of the positive active materials fabricated by the methods of Examples 3 and 4 and Comparative Examples 2 and 3, ratios of diffracted intensity of diffraction lines in 2θ=45° (104 plane) with respect to diffracted intensity of diffraction lines in the vicinity of 2θ=18° (003 plane) were measured under the following measurement conditions, and the results are shown in Table 2.

Tube Voltage/Current: 40 kV/10 mA
Measured Angles: 15 to 75°
Scan Speed: 4°/minute
Sample Rotation Speed: 60 revolutions/minute
Divergence Slit: 1°
Anti scattering Slit: 1°
Light Receiving Slit: 0.3 mm

TABLE 2

| | Ratio of diffracted intensity (104/003) |
|---|---|
| Example 3 | 37% |
| Example 4 | 29% |
| Comparative Example 2 | 56% |
| Comparative Example 3 | 18% |

As shown in Table 2, since the positive active materials of Examples 3 and 4 have Cu intensity ratios within a range of 20% to less than 40%, it can be predicted that these positive active materials have excellent potential and capacity characteristics.

In addition, batteries fabricated by using the positive active materials of Examples 3 and 4 and Comparative Examples 2 and 3 were charged and discharged while the rate was changed to 0.1 C, 0.2 C, 0.5 C, and 1.0 C. Then, their discharge capacities were measured, and the results are shown in Table 3.

TABLE 3

| | Discharge capacity (mAh) | | | |
|---|---|---|---|---|
| | 0.1 C | 0.2 C | 0.5 C | 1.0 C |
| Example 3 | 161.2 | 157.3 | 152.8 | 148.6 |
| Example 4 | 160.7 | 156.4 | 150.2 | 147.7 |
| Comparative Example 2 | 156.3 | 151.0 | 142.5 | 131.6 |
| Comparative Example 3 | 153.8 | 149.8 | 138.5 | 105.6 |

As shown in Table 3, the cells using the positive active materials of Examples 3 and 4 are superior to those of Comparative Examples 2 and 3 in the point of capacity characteristic according to discharge rate. Therefore, it is understood that the prediction from the results shown in Table 2 is correct.

Moreover, in the X-ray diffraction patterns using CuKα-ray of the positive active materials prepared by the methods of Example 3 and Comparative Example 2, full width at a half-maximum of diffraction lines in the vicinity of 2θ=18° (003 plane) were measured under the following measurement conditions, and the results are shown in Table 4.

Tube Voltage/Current: 40 kV/30 mA
Measured Angles: 15 to 70°
Step Size: 0.04°/step
Scan Type Consecutive
Scanning Time per Step: 1.00 s
Divergence Slit: 1°
Light Receiving Slit: 0.1 mm

TABLE 4

| | Full width at a half-maximum |
|---|---|
| Example 3 | 0.137 |
| Comparative Example 2 | 0.193 |

As shown in Table 4, since the positive active material of Example 3 has the half width within a range of 0.08 to 0.16, it can be predicted that this positive active material has excellent cycle-life characteristics.

Figure 2:
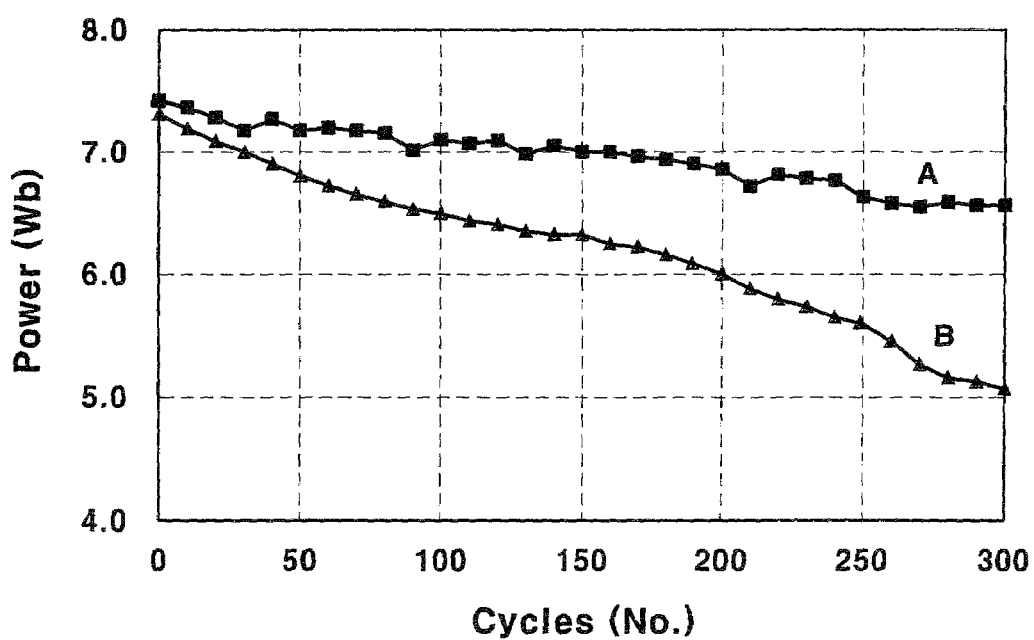
FIG. 2 is a graph showing cycle-life characteristics of positive active materials according to Example 3 of the present invention and Comparative Example 2.

In addition, the cells fabricated by using the positive active materials of Example 3 and Comparative Example 2 were charged and discharged 300 times at 1 C. Then, their cycle-life characteristics were measured, and the results are illustrated in FIG. 2. As shown in FIG. 2, the cell using the positive active material (A) of Example 3 exhibits better cycle-life characteristics than that of Comparative Example 2 (B). Therefore, it is understood that the prediction from the results shown in Table 3 is correct.

As stated above, the positive active material of the present invention has an optimal property of matter that can show excellent battery characteristics.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A positive active material for a lithium secondary battery, comprising a compound represented by formula 1:

$$Li_xCoO_{2-y}A_y \quad (1)$$

wherein x is from 0.90 to 1.04, y is from 0 to 0.5, A is selected from the group consisting of F, S, and P, and the positive active material has a ratio of diffracted intensity of diffraction lines in 2θ=53° (104 plane) with respect to diffracted intensity of diffraction lines in the vicinity of 2θ=22° (003 plane) in X-ray diffraction patterns using a CoKα-ray from 10% to 70%.

2. The positive active material for a lithium secondary battery according to claim 1, wherein the positive active has a ratio of diffracted intensity of diffraction lines in 2θ=45° (104 plane) with respect to diffracted intensity of diffraction lines in the vicinity of 2θ=18° (003 plane) in X-ray diffraction patterns using a CuKα-ray from 20% to less than 40%.

3. The positive active material for a lithium secondary battery according to claim 1, wherein the positive active material has a half width of diffraction lines in 2θ=18° to 20° (003 plane) in X-ray diffraction patterns using a CuKα-ray from 0.08 to 0.16.

4. The positive active material for a lithium secondary battery according to claim 1, wherein the positive active material has an average particle diameter (D50) from 8 to 13 μm.

5. The positive active material for a lithium secondary battery according to claim 1, wherein a diffraction spectrum is measured between angles of 15 to 70° with step sizes of step sizes of 0.02 to 0.06° per step and 0.5 to 1.5 seconds per step using a consecutive scan type, under a tube voltage of 30 to 40 kV and a tube current of 10 to 30 mA and where there is a divergence slit of 1 to 2° and a light receiving slit of 0.1 to 0.5 mm.

* * * * *